Nov. 29, 1927.  
H. C. FOLGER  
METHOD OF REFRIGERATION  
Filed Dec. 7, 1923

INVENTOR:  
Henry C. Folger  
By Henry T. Williams,  
ATTORNEY.

Nov. 29, 1927.  
H. C. FOLGER  
METHOD OF REFRIGERATION  
Filed Dec. 7, 1923

INVENTOR:  
BY  
ATTORNEY.

Nov. 29, 1927.

H. C. FOLGER

METHOD OF REFRIGERATION

Filed Dec. 7, 1923

INVENTOR:
Henry C. Folger
BY Henry T. Williams,
ATTORNEY.

Nov. 29, 1927.　1,651,198

H. C. FOLGER

METHOD OF REFRIGERATION

Filed Dec. 7, 1923　6 Sheets-Sheet 5

INVENTOR:

BY

ATTORNEY.

Nov. 29, 1927.

H. C. FOLGER

METHOD OF REFRIGERATION

Filed Dec. 7, 1923

INVENTOR:
Henry C. Folger
BY
Henry T. Williams
ATTORNEY.

Patented Nov. 29, 1927.

1,651,198

UNITED STATES PATENT OFFICE.

HENRY C. FOLGER, OF WAVERLY, MASSACHUSETTS, ASSIGNOR, BY MESNE ASSIGNMENTS, TO BEMIS INDUSTRIES, INC., OF BOSTON, MASSACHUSETTS, A CORPORATION OF DELAWARE.

METHOD OF REFRIGERATION.

Application filed December 7, 1923. Serial No. 679,061.

The invention to be hereinafter described relates to a method of refrigerating ice-cream and other materials.

It is now customary to manufacture ice-cream and distribute the same to customers on a large commercial scale. Different methods have been employed for refrigerating the ice-cream during transportation on trucks from the manufacturer to the customer. In one method the ice-cream containing cans are placed in tubs packed with ice and salt. In another method the ice-cream containing cans are placed in the body of the truck, and ice and salt are packed around the cans, so that when it is desired to remove a can from the truck, it is necessary to dig down into the ice and salt to expose and furnish access to the can. In still another method the truck body is provided with a chamber having therein a tank and piping containing a brine solution. This piping is usually located near the top of the chamber, leaving a space beneath the same for receiving the ice-cream containing cans. The latter are introduced into the chamber and removed therefrom through a door of substantial size. As a consequence, each time the door is opened to remove a can from the chamber, the warmer outside air rushes into the chamber, raises the temperature of the air therein, and materially reduces the refrigerating efficiency of the apparatus. This refrigerating apparatus is heavy and objectionably adds to the weight of the truck and the expense of transportation.

Each customer usually has a box or cabinet for receiving the ice-cream can or cans while the ice-cream is dispensed therefrom. It has been customary to pack ice and salt around the cans in the cabinet, in order to refrigerate the same. The manufacturer of the ice-cream also supplies the ice and salt for these cabinets. This has made it necessary to provide the truck body with compartments for receiving ice and salt for this purpose. The weight of the ice and salt carried by the truck adds to the expense of transportation. The ice melts more or less while on the truck, and frequently water is continuously leaking and dripping from the truck. Large quantities of ice and salt are required; and this is a substantial expense which materially reduces the profits of the manufacturer.

It is customary for the driver of the truck on delivering a can to a customer, to pack the ice and salt about the can in the customer's cabinet. This is a time consuming operation, and the delay therefrom objectionably lengthens the time required for the driver to cover his route. This further reduces the profits of the manufacturer. After the ice and salt have been packed in the cabinet, their cooling effect diminishes, and it is frequently necessary to remove the melted ice and repack ice and salt about the can, in order to continue the cooling effect required. This is a further expense. Also, the variable refrigerating effect thus produced, causes the ice-cream some of the time to be either too hard or too soft. If it is too hard it is difficult to dispense the same, and if it is too hard or too soft, it is not in the desired condition for sale.

The present invention is a distinct improvement upon the former methods, and overcomes the objections thereto referred to. In accordance with the present method, the refrigerating effect is produced by containers or cartridges desirably of metal and containing a frozen liquid or solution, and preferably one which freezes at a temperature substantially below 32° F. This temperature desirably may be as low as 3° above zero. Different liquids may be employed, such, for example, as a solution of salt and water, or alcohol and water, or calcium chloride and water, all of which have a low freezing point. The containers or cartridges after being nearly filled with such a solution, are closed and preferably sealed, and are placed in a room or chamber having a temperature sufficiently low to freeze the solution.

To refrigerate the ice-cream during transportation, the cans containing the same may be placed in a specially constructed truck which has separate chambers for receiving the ice-cream containing cans and the cartridges. These chambers are so related that the air cooled by the cartridges may surround the chamber or chambers containing the ice-cream containing cans and efficiently refrigerate the same. The chambers containing the cans are without communication with the chambers receiving the cartridges, so that when a chamber is opened for the purpose of removing a can or cans therefrom, the chambers containing the cartridges will not be exposed to the temperature raising effect of the warmer outside air. This is important, since the solution frozen at the low temperature referred to, is quickly responsive to warmer temperatures. The truck may be provided with a number of separate chambers for receiving the cans, and a number of separate chambers for receiving the cartridges, and the number of these chambers may be varied according to the capacity of the truck required.

After the truck has been loaded with the cans and cartridges, the driver starts on his route. He delivers an ice-cream containing can or cans to each customer, and he may also deliver cartridges to the customer, in sufficient number properly to refrigerate the cans. For example, he may supply two of the cartridges for refrigerating each ice-cream containing can.

Each customer is supplied with a specially constructed cabinet for receiving the ice-cream containing cans and the cartridges, said cabinet having provision for preventing the cartridges from exposure to the warming effect of the outside air when ice-cream is dispensed from the can.

Thus, the cartridges not only may serve to refrigerate the ice-cream containing cans during transportation, but also while the cans are in the customer's cabinet.

There are important advantages in this method. The necessity for carrying ice and salt on the truck and the use thereof in the cabinet are eliminated. No time is lost in handling the ice and salt, and packing the same about the cans in the customers' cabinets, so that the driver may cover his route in a much shorter time than theretofore has been possible. It is unnecessary to repack the cans in the cabinets with ice and salt, in order to continue the refrigeration of the ice-cream. The cartridges have a substantially uniform refrigerating effect in the cabinet, so that the ice-cream may be maintained with the desired degree of hardness.

One good form of truck and one good form of cabinet which may be employed in the practice of the method of the present invention are disclosed in the accompanying drawings, wherein.

Referring to the drawings, in the present instance of the invention, the vehicle for transporting the refrigerating materials is in the form of a truck provided with a box or body 1 having a bottom 3, a front wall 5, a rear wall 7 and side walls 9. These walls may be formed of balsa wood or other suitable material, and the walls and bottom may be lined with layers 11 of cork or other suitable insulation material which will be effective in tending to keep the warm outside air from entering the interior of the box.

Figure 2:
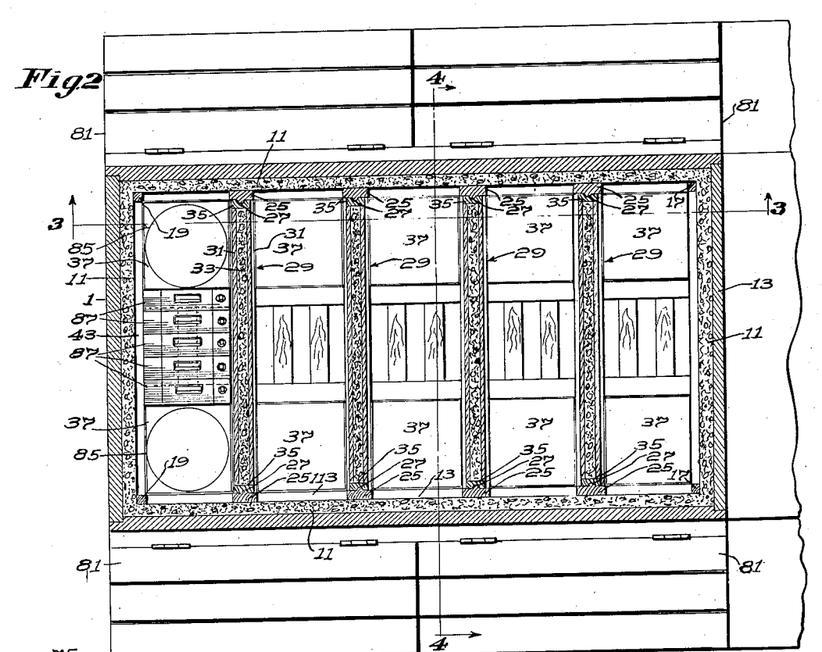
Fig. 2 is a horizontal section through the body of the truck.
Figure 3:
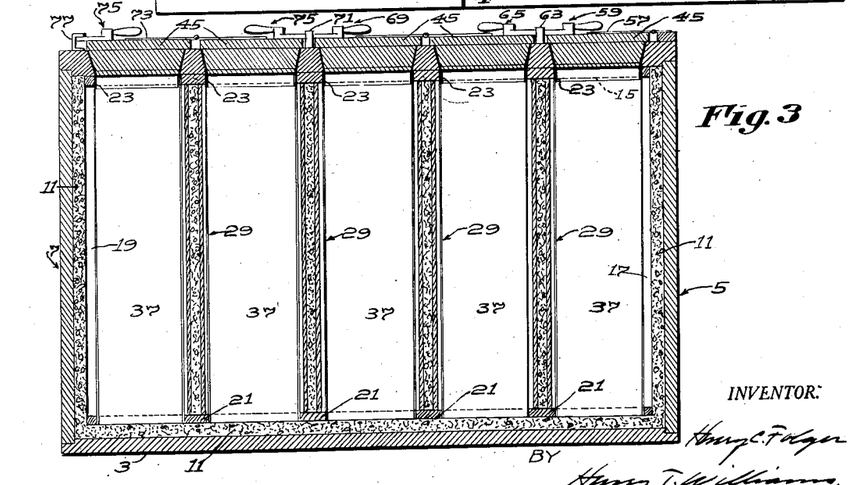
Fig. 3 is a vertical longitudinal section taken on line 3—3 of Fig. 2.
Figure 4:
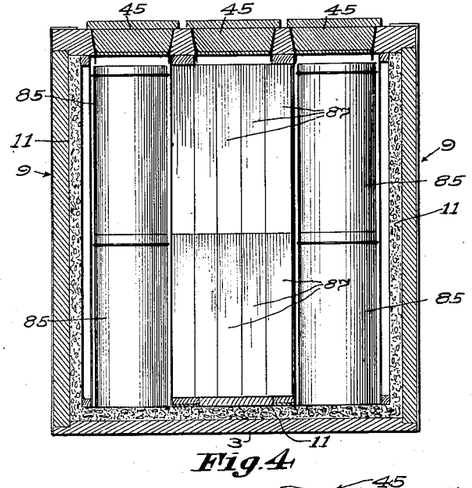
Fig. 4 is a vertical transverse section taken on line 4—4 of Fig. 2.

Mounted in the box are a bottom frame 13, a top frame 15 and front and rear frames 17 and 19. The bottom frame 13 has transverse members 21 spaced at intervals, and the top frame has transverse members 23 spaced at intervals. The bottom frame members 21 and the top frame members 23 are connected by upright members 25 at the sides of the box and provided with tongues 27 (Fig. 2). Mounted in the box at intervals are partitions 29, each formed of outside layers 31 of wood or other suitable material between which is a layer 33 of cork or other suitable insulation material, said layers being secured in assembled relation by any suitable means. At opposed vertical edges of each of these partitions 29 are members 35 provided with grooves adapted to mate with the tongues 27 referred to, in the upright members 25.

Figure 5:
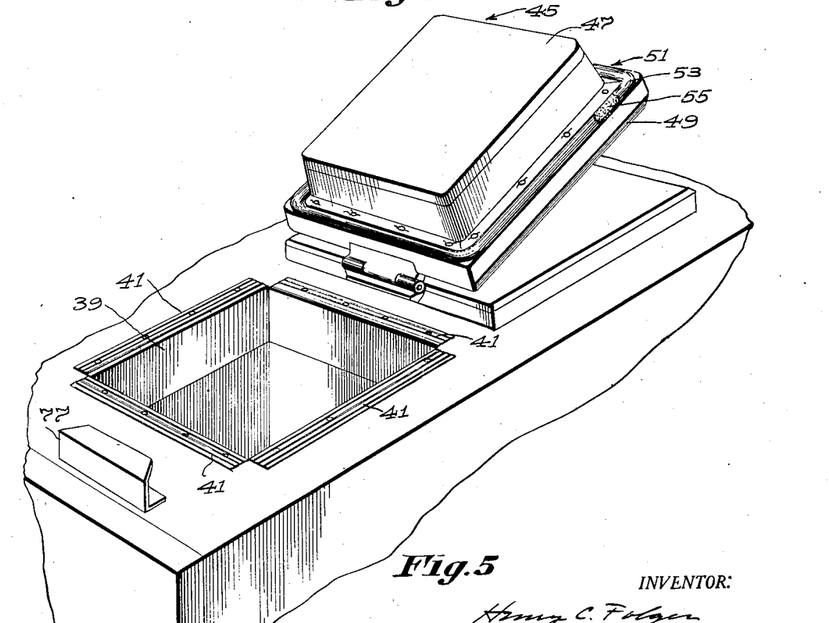
Fig. 5 on an enlarged scale is a perspective view of a top portion of the truck body.

The partitions 29 divide the box into compartments extending the width of the box. Projecting into each of the compartments are a pair of cells 37 formed of sheet metal, and in the present instance, having the capacity to receive two five-gallon ice-cream cans, one on top of the other. At the upper end of each of the cells is a collar 39 (Fig. 5) having outstanding flanges 41 overlapping the upper surface of the top of the box and suitably secured thereto. These flanges preferably are ribbed, for a purpose to be described.

The cells 37 are located at opposite sides of the box and are spaced apart so as to leave in each compartment a chamber 43 adapted to receive the cartridges to be described. The cells are spaced from the walls of the compartments, in order that air may circulate from the cartridge receiving chambers around the cells.

In the present instance of the invention, the box is divided into five compartments, and each of the compartments contains two cells for receiving ice-cream cans or other materials, and an intermediate chamber for receiving the refrigerating cartridges. As a result, the cartridges in each compartment will serve to refrigerate the materials in the two cells of said compartment.

Figure 1:
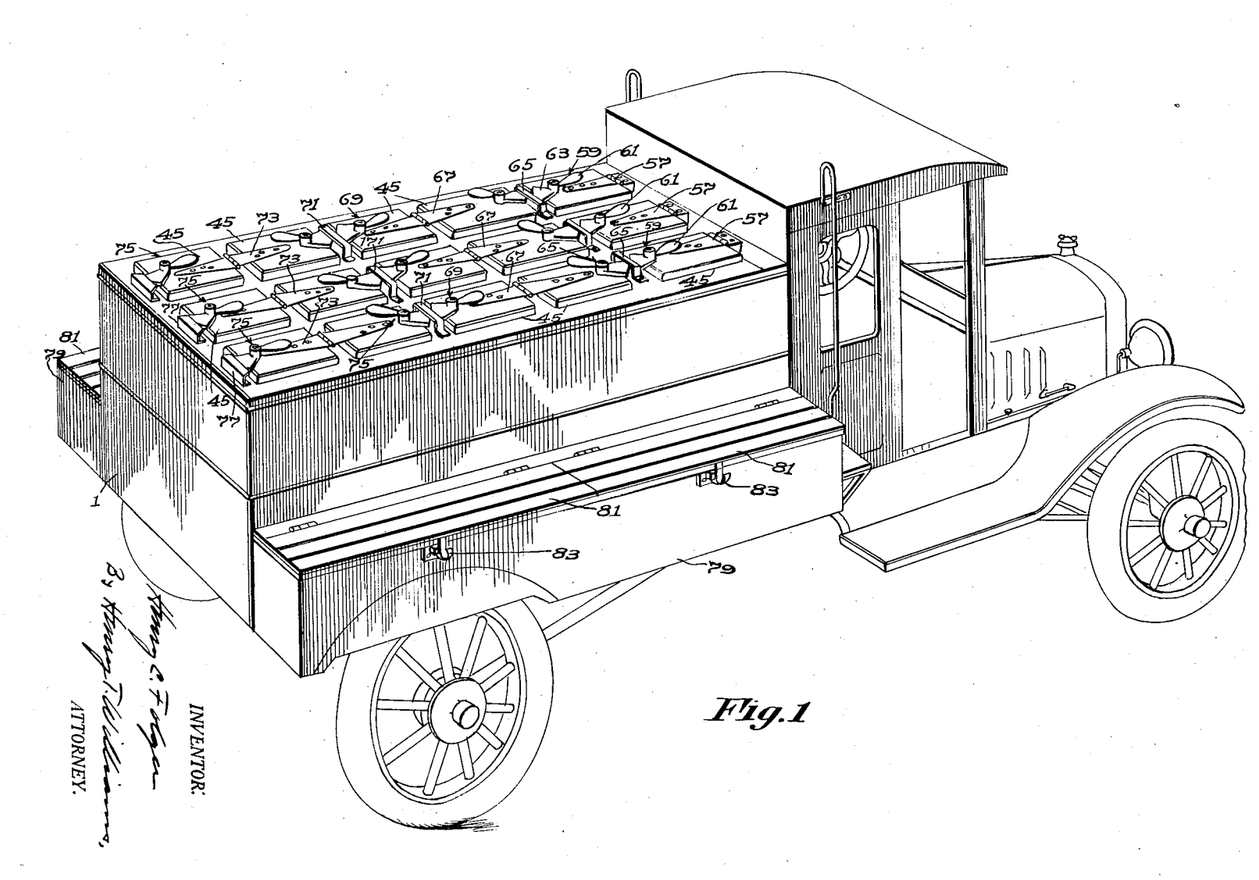
Fig. 1 is a perspective view of the truck.

The cells and chambers may be provided with covers 45, each having a body 47 (Fig. 5) and an outstanding flange 49, the latter being provided on the inner face thereof with a packing 51 (Fig. 1), in the present instance, in the form of a rubber tube 53 stuffed with cotton 55. When the cover is closed, this packing is adapted to engage the ribbed flanges 41 of the collar 49 referred to, so as to insure tight closure of the cover.

The covers for the cells and chamber of the front compartment may be provided with hinges 57 (Fig. 1) secured to the covers and to the top of the box. The covers may be locked in closed positions by latches 59 having handles 61 and cam plates 63, whose upper surfaces are oblique with respect to the plane of the covers, and these cam plates cooperate with bails 65 secured to the box top. The construction is such that the latches may be shifted to cause their cam plates to engage the bails and react against the latter so as to press the covers downward and compress the packings 51 into tight engagement with the collar flanges 41.

The covers for the two compartments directly back of the front compartment may be connected by hinges 67 provided with latches 69 cooperating with bails 71 similar to those already described. The covers for the two rear compartments may be connected by hinges 73, and may be provided with latches 75. The latches 75 for the covers of the rear compartment cooperate with channel members 77 secured to the box top, and the latches 75 for the covers of the compartment next to the rear compartment cooperate with the bails 71 adjacent thereto. Thus these bails serve to cooperate with the latches 69 and 75.

Projecting from the opposite sides of the box are chambers 79 (Fig. 1) having hinged covers 81 provided with latches 83, said chambers being adapted to receive empty ice-cream cans. The covers 81 of these chambers may desirably serve as platforms on which the truck driver may stand to give him ready access to the top of the box, for the purpose of placing ice-cream cans into the cells and removing the same therefrom, and for the purpose of placing cartridges in the chambers and removing the same therefrom.

The ice-cream cans 85 may be of the usual cylindrical form, and as stated, the capacity of each cell may be sufficient to receive two five-gallon cans, one on top of the other. Since in the present instance there are ten of the cells in the truck box, it is adapted to carry twenty five-gallon ice-cream cans.

Figure 12:
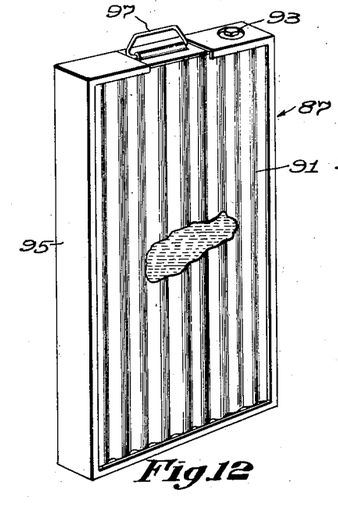
Fig. 12 is a perspective view of one of the frozen solution containing cartridges.
Figure 13:
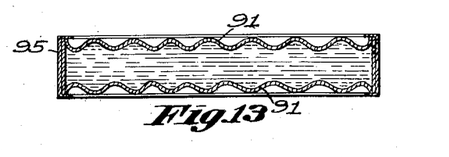
Fig. 13 is a horizontal section through the cartridge shown in Fig. 12.

Preferably the cartridges containing the frozen liquid are of oblong form. Referring to Figs. 12 and 13, the cartridge 87 shown therein has opposed sides 91 which preferably are corrugated to furnish strength and to allow expansion and contraction under temperature changes. Also, these corrugated sides provide extended surfaces contributing to quick freezing of the solution in the cartridge, and contributing to the effective refrigeration effect thereof. The cartridge has edges, a bottom and a top, the latter being provided with a neck normally closed by a screw plug 93. The cartridges may be formed of sheet metal. To contribute to the strength of the cartridge, the bottom, top and edges may be provided with a channel-shaped reinforcing band 95 having its flanges inturned and overlapping the corrugated sides of the cartridge. The spaces between the flanges and the corrugations may be filled with solder or other suitable material which may be beveled away from the edges of the flanges to facilitate placing the cartridges in piles in the freezing room. After a cartridge has been nearly filled with the liquid to be frozen, the plug may be inserted in the neck, and may be soldered to the neck or otherwise permanently secured. The cartridge may be provided with a suitable handle 97 at its top to facilitate handling thereof.

In the present instance of the invention, the capacity of each of the chambers 43 between the cells is sufficient to accommodate ten of the cartridges described. Five of the cartridges are fitted into the chamber and rest on the bottom of the box, and five more of the cartridges rest upon the same. Since the two cells of a compartment accommodate four ice-cream cans, the chamber between the cells will contain eight cartridges, two for each can, and two extra cartridges for a purpose to be described.

Figures 6, 7, 8:
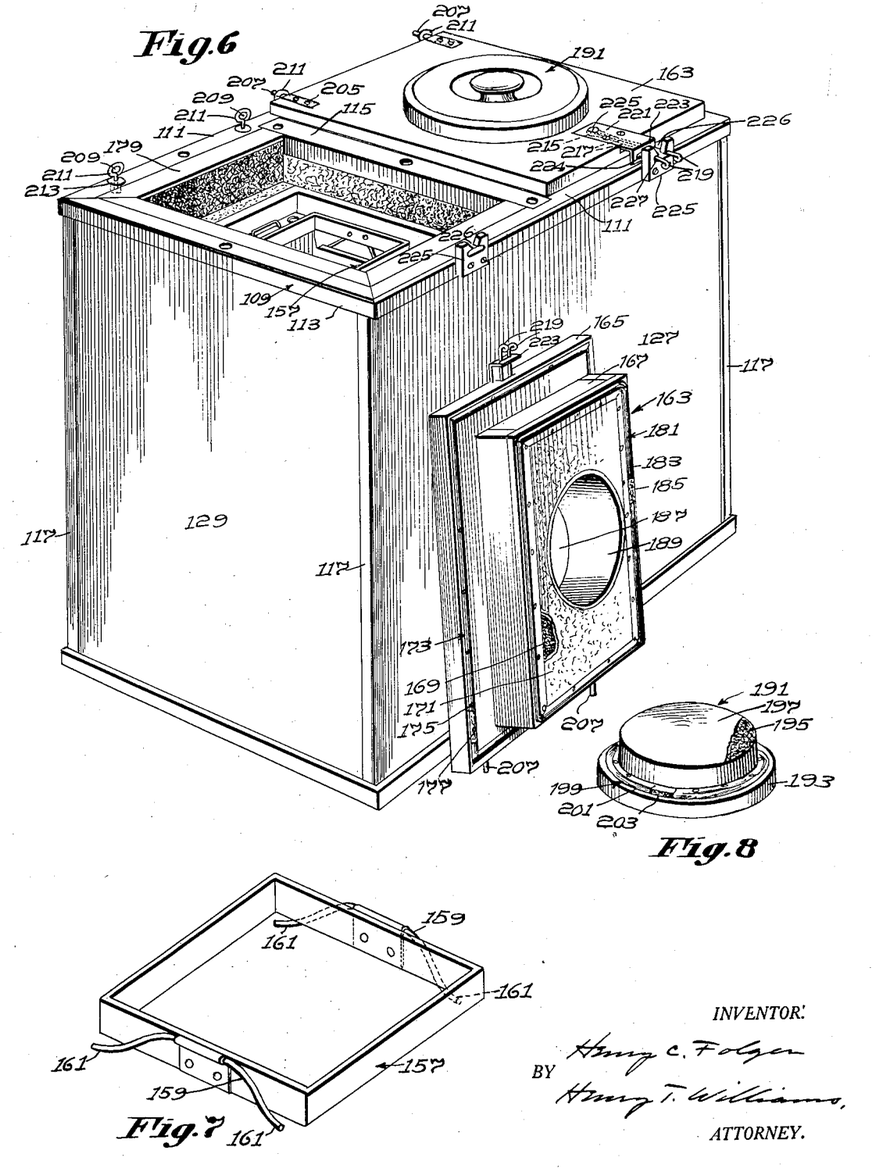
Fig. 6 is a perspective view of the cabinet showing one of the covers thereof removed.
Fig. 7 is a perspective view of one of the can supporting frames.
Fig. 8 is a perspective view of the cap for one of the covers.
Figure 9:
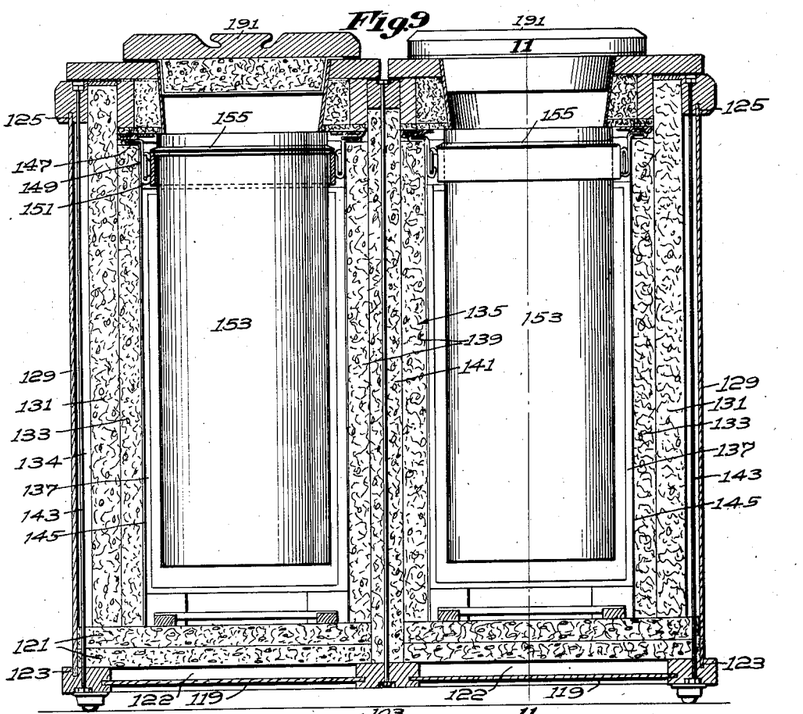
Fig. 9 is a vertical section through the cabinet.
Figure 10:
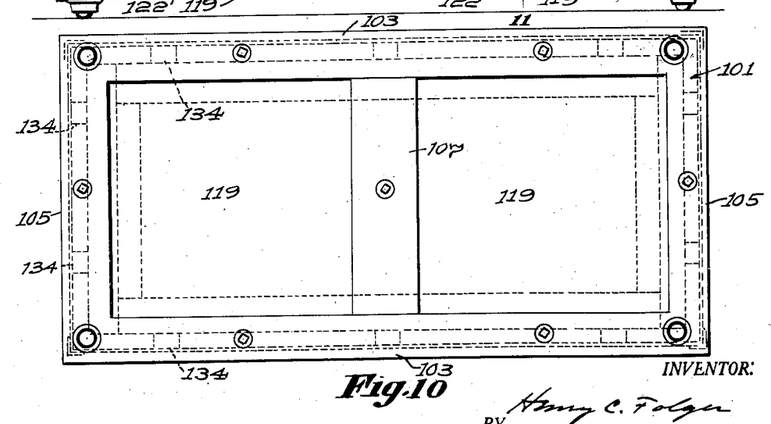
Fig. 10 is a view looking up toward the bottom of the cabinet.
Figure 11:
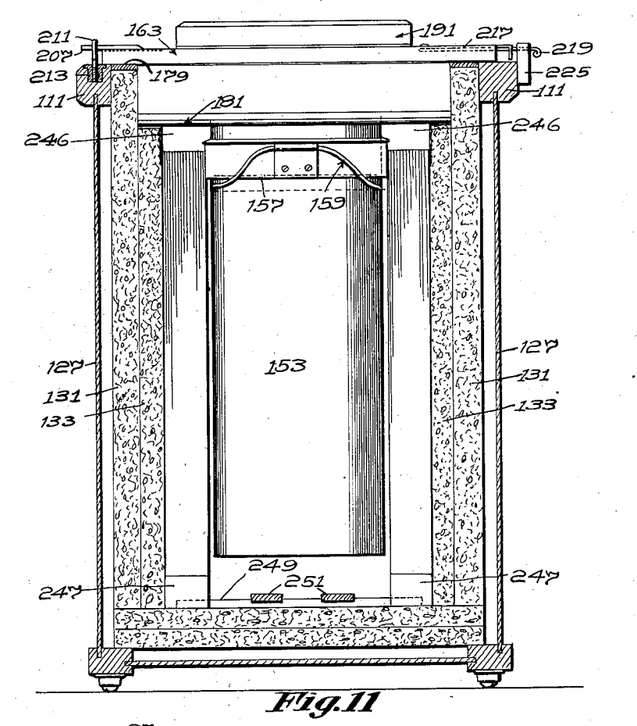
Fig. 11 is a vertical section taken on line 11—11 of Fig. 9.

The cabinet comprises a bottom frame 101 (Fig. 10) including side bars 103 and end bars 105, and an intermediate bar 107 between the side bars 103. At the top of the cabinet is a frame 109 (Figs. 6, 9 and 11) comprising side bars 111, end bars 113, and an intermediate bar 115 between the side bars 111. These frames may be of wood or other suitable material. Connecting the bottom frame 101 with the top frame 111 at the corners of the cabinet, are upright metal angle bars 117 having their ends set in angle grooves in the top and bottom frames.

Secured to the under side of the bottom frame 101 are floors 119 of wood or other suitable material. Cork layers 121 rest upon the bottom frame. There are air spaces 122 between the lower cork layers and the floors 119. The bottom frame has grooves 123, and the top frame 109 has grooves 125 in which are fitted side panels 127 and end panels 129 of wood, steel or other suitable material. Within and spaced from said panels are outer cork layers 131 and inner cork layers 133. The outer cork layers may be held in spaced relation to the panels by vertical strips 134.

The cabinet has a partition 135 dividing the same into two compartments or chambers 137. Said partition may be formed of a pair of cork layers 139 and an intermediate cork layer 141.

The walls and partition thus formed may be held securely in assembled relation with respect to the top and bottom frames by through bolts 143 extending at suitable intervals through bars of the top and bottom frames. Thus a strong construction is provided without the use of screws or nails.

The cork walls of the chamber 137 may have galvanized steel linings 145. The inner cork layers 133 and 139 are somewhat shorter than the layers 131 and 141, and resting on the upper edges thereof are outstanding flanges 147 of collars 149 which extend somewhat down into the linings 145, and are formed to provide seats or ledges 51, for a purpose to be described.

Each of the chambers is adapted to receive a cell or chamber to contain the materials for refrigeration. In the present instance of the invention, this cell is in the form of an ice-cream can 153 (Fig. 9) of cylindrical form, and desirably having a capacity of five gallons. Adjacent the upper edge of the can is a circumferential outstanding bead 155.

Suitable means may be provided yieldingly to support the can in the chamber 137. In the present instance, this means comprises a rectangular frame 157 (Fig. 7) having at opposite sides thereof wire springs 159 of yoke form, and having feet 161 projecting downward from the frame somewhat and adapted to rest upon the seats 151 referred to.

The can may be lowered through the frame 157 into the chamber 137 until the bead 155 of the can reaches and rests upon the upper edges of the frame 157.

Each of the chambers may be provided with a cover 163 (Figs. 6, 9 and 11) having a top layer 165 of wood. Projecting inward from the layer 165 is a frame 167 in which is placed a block 169 of cork and an outer thin layer 171 of a high grade, more compact form of cork known as gasket cork. The under face of the top layer 165 of the cover is provided with a packing 173 desirably in the form of rubber tubing 175 stuffed with a cotton core 177. This packing is adapted to rest against a wood frame 179 resting upon the upper edges of the cork layers 131 referred to. The inner face of the frame 167 of the cover is provided with a packing 181 desirably in the form of rubber tubing 183 stuffed with a cotton core 185. This packing is adapted to rest against the flange 147 of the collar 149 referred to.

The cover has a tapered opening 187 therein having an aluminum lining 189. This opening is normally closed by a cap 191 comprising a top layer 193 of wood, on the inner face of which is a cork disk 195 enclosed in an aluminum covering 197. On the inner face of the top layer 193 is a packing 199 desirably in the form of rubber tubing 201 stuffed with a cotton core 203. When the cap is placed over the opening, the packing 199 will engage the margin of the cover surrounding the opening, and provide a tight closure of the cap on the cover.

To secure the covers in closed position, each of them may have a pair of straps 205 secured to the rear portion thereof and having outstanding pins 207 for insertion into eyes 209 of screws 211 threaded in metal sockets 213 set into and secured to the top frame.

At the front of each cover is a latch comprising a spring wire bent to present an eye 215 and arms 217 having handles 219 at ends thereof. This latch is set in a recess in the cover beneath a plate 221 secured to the cover and having a downward projecting flange 223 with an elongated slot 224 therein. A screw 225 is entered through the plate and the eye 215 and the arms 217 project out through the slot 224, the ends of which limit the outspreading of the arms due to the resilience of the wire. A lock plate 225 is secured to the top frame and has a flaring mouth 226 leading to the lock slots 227.

The construction is such that when it is desired to close the cover, the pins 207 are inserted into the eyes 209 and then the cover is pressed down causing the arms 217 to pass through the flaring mouth 226 and then snap out into locking engagement with the slots 227.

Closing of the covers will compress the packing 173 into tight engagement with the frames 179, and press the packing 181 into tight engagement with the collar flanges 147.

The relation of the covers to the upper edges of the cells or cans 153 referred to, is such that the gasket cork layers 171 will come into engagement with the upper edges of the cans before the covers are tightly closed. The eye screws 211 may be adjusted so that the downward pressure of the covers to tight closed position will cause the covers to press the cans downward somewhat against the yielding resistance of the yoke springs 159 which support the frames 157 on which the circumferential beads 155 of the cans rest. As a consequence, when the covers are closed, the inner faces of the covers and the upper edges of the cans are in tight engagement.

The chambers in the cabinet may be formed to receive the cartridges, and in the present instance of the invention, each of the chambers has spaces 246 at opposite sides of the can for receiving two cartridges. When the cover for one of the chambers is opened, two of the cartridges may be readily lowered into said spaces, where they will desirably serve to refrigerate the ice-cream or other materials in the cell or can in said chamber. At the bottom of each chamber there may be provided a frame comprising four blocks 247 connected by a pair of slats 249. Secured to the latter and extending transversely thereof are a pair of slats 251. The cartridge may rest upon the blocks 247, and bricks of ice-cream or other materials may be placed upon the slots 251, if desired.

It will be noted that there is an air space around the can and at the top and bottom thereof through which the cooling effect of the cartridge may be transmitted and distributed to the can.

In the practice of the method, the cartridges are nearly filled with the solution which freezes at a temperature substantially below 32° F. The cartridges are closed and then placed in a freezing room where they are subjected to a temperature sufficiently low to freeze the solution.

Then the truck is loaded by placing ice-cream containing cans in the cells and placing the frozen liquid containing cartridges in the chambers between the cells. In the truck described there are ten cells, each accommodating two cans, and there are five chambers, each accommodating ten cartridges. The chambers containing the cartridges communicate with air spaces which surround the cells, and therefore, the refrigerating effect of the cartridges will be desirably distributed about the cells. However, the chambers containing the cartridges are not in communication with the interiors of the cells in which the ice-cream containing cans are placed. After the cans and cartridges have been loaded on the truck, the covers for the cells and chambers are closed and secured.

The truck driver then starts on his route to deliver the ice-cream to customers' destinations. On reaching a customer, the driver steps onto one of the platforms at the side of the truck body, opens the cover for one of the cells and removes a can or cans therefrom. He also may open the cover for one of the chambers and remove cartridges therefrom, which may be employed to accompany the ice-cream can or cans, in order to continue the refrigeration. Two cartridges may desirably accompany each can.

Then he may place an ice-cream can and two cartridges in one of the chambers of the cabinet, and if the customer requires two cans of ice-cream, the driver also places a can and two cartridges in the other chamber of the cabinet. Then he closes the cabinet covers and secures the same. This causes the under surfaces of the covers to be pressed down tightly against the upper rims of the cans, thereby preventing the spaces occupied by the cartridges from having communication with the interiors of the cans.

When the customer desires to dispense ice-cream from one of the cans, he removes the cover cap, thereby affording convenient access to the ice-cream in the can. However, removal of the cap does not expose the spaces containing the cartridges to the warming effect of the outside air. This is important in contributing to the effectiveness of the cartridges in continuing their desired refrigerating effect for a substantial length of time, which is considerably greater than the effective refrigerating period of ice and salt packed about the cans.

Thus, the truck driver proceeds from customer to customer, and supplies each with the number of ice-cream cans and refrigerating cartridges required. By the practice of this method, he is able to cover his route in a much shorter time than has been possible by former methods. He loses no time in handling ice and salt. The substantial expense of ice and salt is eliminated.

The two extra cartridges in each chamber of the truck, are available, if required, for transfer into a customer's cabinet to prolong refrigerating effect of ice-cream in a can previously delivered to the cabinet.

The truck disclosed herein is shown and claimed in Letters Patent No. 1,511,453, granted to me October 14, 1924, and the cabinet disclosed herein is shown and claimed in Letters Patent No. 1,511,454, granted to me October 14, 1924.

While the customer's refrigerator is here shown in the form of a cabinet, it will be understood that other forms of refrigerators might be used and still be adapted for receiving ice-cream cans and cartridges to refrigerate the same. While the method has been described more particularly with reference to refrigeration of ice-cream, it will be understood that other materials may be refrigerated, if desired.

It will be understood that the invention is not limited to the specific method disclosed herein, and that various deviations may be made therefrom without departing from the spirit and scope of the appended claims.

What is claimed is:—

1. A method of refrigerating ice cream characterized by associating in an air space of a refrigerating cabinet in separate independent relation, an ice cream containing can and readily portable separate closed metal cartridges containing a chemical solution frozen at a temperature substantially lower than 32° F., and arranging said cartridges at the sides of the can so as to provide an air space between the cartridges and can and around the can for transmitting and uniformly distributing through the air the cooling effect of the cartridges to the can.

2. A method of refrigeration characterized by placing in a refrigerating compartment surrounding a refrigerating container to be kept cool, a plurality of separately portable, closed cartridges containing a frozen chemical solution which freezes at a temperature substantially lower than 32° F., and arranging said cartridges so that they may be easily removed without disturbing the compartment or its contents.

HENRY C. FOLGER.